Patented June 17, 1952

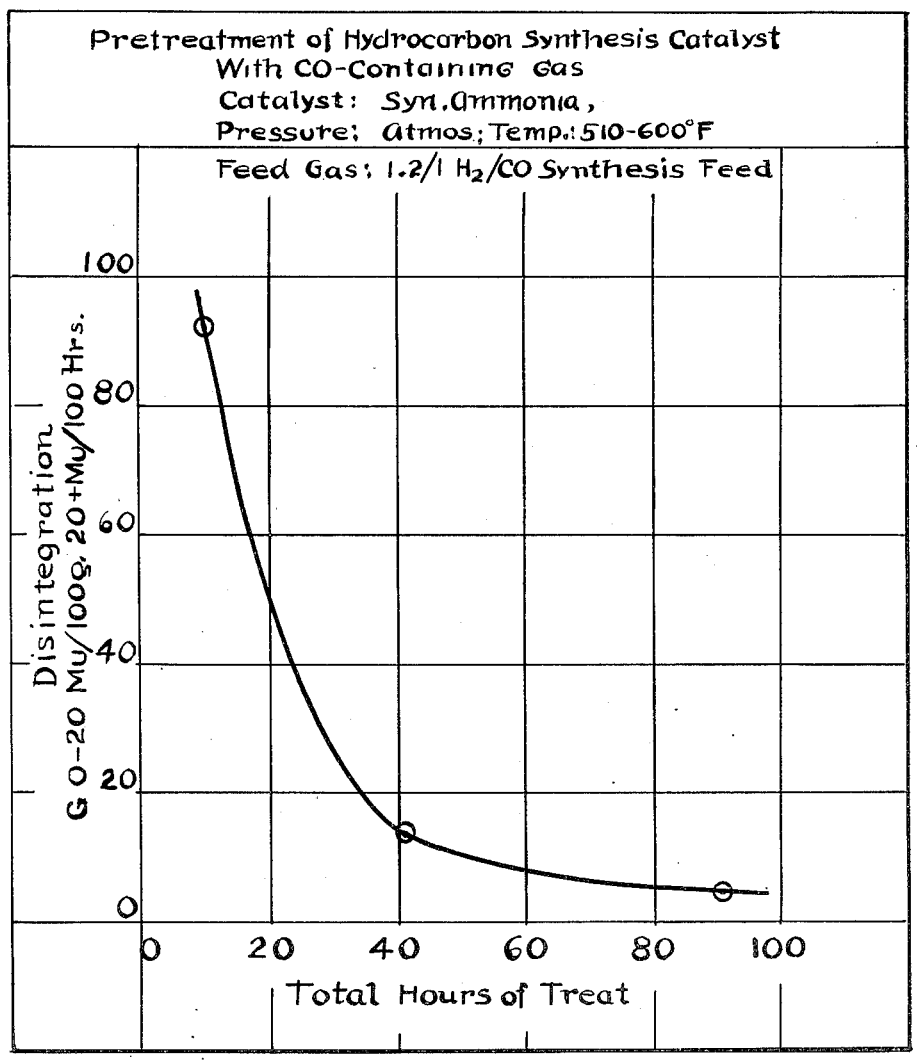
FIGURE-I

2,601,121

UNITED STATES PATENT OFFICE 2,601,121

PRECONDITIONING HYDROCARBON SYNTHESIS CATALYST AND REMOVING FINES THEREFROM

William J. Mattox, Baton Rouge, La., assignor to Standard Oil Development Company, a corporation of Delaware Application April 29, 1948, Serial No. 24,067

6 Claims. (Cl. 252—443)

The present invention relates to improvements in the reduction of the oxides of carbon in the presence of a powdered iron-type catalyst which is maintained in the form of a fluidized bed in a reaction zone. In particular, the invention relates to preconditioning the catalyst prior to actual use in the reduction of the oxides of carbon to form hydrocarbons and oxygenated hydrocarbons, the purpose of the preconditioning of the catalyst being to render the same highly active and selective for the formation of desirable compounds and at the same time resistant to fragmentation or physical disintegration during the synthesis reaction.

Heretofore and prior to the invention it was known that iron, particularly iron promoted with minor amounts of certain alkali metal compounds such as potassium fluoride, potassium carbonate, potassium or sodium acetate and numerous others, provided an active catalyst in the synthesis of hydrocarbons and oxidized hydrocarbons from a synthesis feed gas containing carbon monoxide and hydrogen. It has also been disclosed in the literature that this type of operation may be carried out employing the so-called fluidized catalyst technique, a procedure in which the catalyst in powdered form is suspended in the gasiform reactants in a reaction zone to form a dense, turbulent, ebullient suspension of catalyst in said gasiform material.

However, the researches have demonstrated that when the hydrocarbon synthesis operation is conducted in the presence of an iron-type catalyst, the catalyst becomes contaminated with carbonaceous deposits, as synthesis proceeds, and the time comes when the catalyst tends to undergo fragmentation or physical disintegration to the extent that an inordinately large proportion of fines (0–20 micron size material) is formed. When the fluidized mass or bed of catalyst contains a large quantity of fines it becomes difficult, if not impossible, to maintain the powdered catalyst in a well fluidized state. An attribute of the ordinary fluidized catalyst operation is that a separation may be effected in the reactor of the main bulk of the catalyst from the gasiform reactants. When, however, the catalyst contains an excessive quantity of fines, such separation is not possible, or at least, is difficult. Then, obviously, it is desirable to prevent fragmentation of the catalyst since the fines thus produced tend to pass out of the reactor with the gaseous products rather than to remain in the said reactor. Furthermore, the presence of fines in excessive quantities in the fluidized bed of catalyst impairs the uniformity of mixing of the catalyst which is a characteristic advantage of a well fluidized bed. As a result of this impaired or poor mixing of the catalyst, it is difficult, if not impossible, to maintain a substantially uniform temperature throughout the bed of catalyst and there is a tendency to develop localized "hot spots" in the catalyst bed and the fluidization is otherwise unsatisfactory.

In carrying the invention into effect, the iron-type catalyst is precarbided. In this operation a substantial portion of the iron is probably converted to iron carbide and some free carbon or carbonaceous material is deposited on the catalyst which causes the formation of fines from the weaker portions of the catalyst and which are thereafter separated from the coarser materials, the latter being highly suitable for use in the fluidized hydrocarbon synthesis reaction.

Other and further objects of the invention will appear in the following more detailed description and claims.

In brief summary, the present invention consists essentially of treating the particles of iron-type catalyst, while in a fluidized state, with carbon monoxide, or a gas containing carbon monoxide, the particle size of the catalyst subjected to this treatment being somewhat larger than that to be used in the hydrocarbon synthesis operation. The catalyst may or may not be subjected to a preliminary reduction with hydrogen although it is usually preferable to carbide the catalyst while the same is in reduced form. That is to say, prior to the treatment with the gas containing carbon monoxide, the catalyst, which may be in the form of an iron oxide, such as $Fe_2O_3$, $Fe_3O_4$, etc., is preferably treated with a hydrogen-containing gas to reduce the oxygen content to less than about 10% oxygen by weight.

Suitable temperatures for the treatment with the carbon monoxide-containing gas, according to the present improvements are within the limits of from about 500 to 900° F. but preferably within the range of from about 600 to 750° F. During this precarbiding of the catalyst a pressure is maintained in the treating zone of from about atmospheric to about 400 pounds. If hydrogen is present in the carbon monoxide-containing gas, the $H_2/CO$ ratio may vary between about 1/1 and about 50/1 although ratios in excess of about 2/1 are usually preferred. Under these conditions the carbiding of the catalyst is accomplished by the formation of some free carbon with the result that the catalyst particles undergo a controlled, minor expansion. This controlled carbiding in conjunction with the turbulence maintained in the fluidized bed, is sufficient to effect attrition of a substantial portion of the weaker catalyst particles so that the resulting fines having unsatisfactory fluidization properties can be readily separated from the remaining catalyst which is characterized by a favorable resistance to further particle disintegration, high activity, and good selectivity to desirable compounds.

Following the treatment of the iron catalyst with the gas containing carbon monoxide, the larger particles are separated from the fines by any suitable means such as screening or by elutriation. Thus, that portion of the catalyst which has been disintegrated physically to particle sizes unsuitable for use in the fluid operation is removed from the bed and the larger particles which may be satisfactorily used as a fluidized bed in the hydrocarbon synthesis reaction zone are retained. The latter portion of catalyst has been found to be highly resistant to further fragmentation or physical disintegration to particle sizes too small to be properly fluidized.

In the accompanying drawing in the figure, there is shown graphically the effect of pretreating a powdered iron-type catalyst with a carbon monoxide-containing gas as regards the resistance of the thus treated powdered iron-type catalyst to fragmentation and physical disintegration when subjected to severe hydrocarbon synthesis conditions.

Referring in detail to the graph shown in the figure, the catalyst pretreated was an iron catalyst, commonly employed in the synthesis of ammonia from its elements, that is to say, a fused promoted magnetite which had been ground to a fluidizable particle size and which analyzed 28% 0–20 microns, 42% 20–80 microns and 30% 80+ microns. This catalyst, in the form of a fluidized mass, was subjected to the influence of a gas containing 1.2 mols of hydrogen per mol of carbon monoxide for a total period of about 92 hours at a temperature within the range of from 570°–650° F. while maintaining the treating zone under a pressure of about 1 atmosphere. It will be noted from the graph that during about the first 20 hours of this treatment, the rate of fragmentation of the catalyst was high, decreasing from a rate of about 92 grams of 0–20 micron material formed per 100 grams of 20+ micron material per 100 hours at hour 10, to a rate of about 48 grams of 0–20 micron material formed per 100 grams of 20+ micron material per 100 hours at hour 20. Beginning at about the 20th hour of the treatment, the rate of catalyst fragmentation or physical disintegration leveled off so that from about the 40th to 96th hour very little fragmentation occurred.

To explain the invention more fully I have set forth below in Table I the conditions under which the synthetic ammonia catalyst was treated and the duration of each period of treatment in hours as well as the temperature employed during the three operating periods therein referred to. The table also contains an analysis by the Roller method which gives the particle size distribution of the catalyst at the beginning and end of each period. The table also gives the percentages of carbon and oxygen on the catalyst at the beginning and end of each period. At the bottom of the table there is set forth the rate of catalyst disintegration. It will be noted that during the third period the rate of disintegration was very low, there being only 4 grams of 0–20 micron material formed per 100 grams of 20+ micron material per 100 hours as compared with 92 grams for the first period.

TABLE I

*Pretreatment of hydrocarbon synthesis catalyst with CO-containing gas*

Catalyst: Syn. ammonia
Pressure: Atmospheric
Feed Gas: 1.2/1 $H_2/CO$ synthesis gas

| Period No. | 1 | 2 | 3 |
|---|---|---|---|
| Run Hours | 0–20.5 | 20.5–62 | 62–119.5 |
| Length of Period, hrs | 20.5 | 41.5 | 57.5 |
| Temperature, °F | 600 | 570 | 600 |
| Catalyst Analysis—Start of Period—Roller, Weight Per Cent: | | | |
| 0–20 microns | 27.8 | 39.0 | 34.7 |
| 20–40 microns | 20.5 | 19.9 | 23.7 |
| 40–80 microns | 21.8 | 19.2 | 24.0 |
| 80+ microns | 29.9 | 21.9 | 17.6 |
| Carbon, weight, per cent | 0.9 | 7.5 | 14.3 |
| Oxygen, weight, per cent | 24.5 | 17.8 | 18.6 |
| End of Period—Roller, Weight Per Cent: | | | |
| 0–20 microns | 39.0 | 42.2 | 34.3 |
| 20–40 microns | 19.9 | 21.1 | 20.4 |
| 40–80 microns | 19.2 | 21.1 | 12.8 |
| 80+ microns | 21.9 | 15.6 | 32.5 |
| Carbon, weight, per cent | 7.5 | 15.6 | 10.0 |
| Oxygen, weight, per cent | 17.8 | 17.9 | (18.6) |
| Disintegration, G. 0–20 Mu/100 g. 20+ Mu/100 Hrs | 92 | 13 | 4 |

The pretreated iron-type catalyst may be successfully employed in the hydrocarbon synthesis reaction as carried out under the usual conditions of operation, namely, at a temperature of from 550 to 750° F.; at a total pressure in the reaction zone of from about 250 to 600 p. s. i. g. or higher; feed rates of about 10 to 40 volumes (measured under standard conditions of temperature and pressure) of fresh feed per pound of iron in the reactor per hour; and with iron base catalysts which may be derived from numerous sources such as are obtained by the roasting and subsequent reduction of pyrites, by the reduction of various pigment iron oxides and other similar oxides from known sources.

Numerous modifications of the invention may be made by those familiar with this art without departing from the spirit thereof.

What is claimed is:

1. In the method of preconditioning an iron catalyst in powdered form to adapt it for fluidization in a hydrocarbon synthesis process, the steps of subjecting the said powdered iron-type catalyst while maintained in the form of a fluidized bed to the influence of a gas containing $H_2$ and CO in which the $H_2/CO$ ratio is from about 1–5 mols of $H_2$ per mol of CO at elevated temperatures within the range of from about 500° F. to 900° F. for an extended period of time whereby a substantial proportion of the iron is converted to iron carbide and the catalyst undergoes at least partial fragmentation to sizes too small to be satisfactorily adapted to fluidization and thereafter separating a portion of the fines and recovering for use in said hydrocarbon synthesis process the portion adaptable to fluidization.

2. The method of preconditioning of claim 1 in which the catalyst originally in the form of an oxide is subjected to a reduction with hydrogen to convert a major portion of the iron oxide to metallic iron prior to the said preconditioning operation.

3. The method of preconditioning of claim 1 in which the carbiding and/or carbonization operation is carried out at pressures from about atmospheric to about 400 pounds, and for periods of time from about 5 hours to about 100 hours with gases containing carbon monoxide.

4. The method of preconditioning of claim 1 in which the average particle size of the catalyst being treated is greater than that to be employed in the hydrocarbon synthesis operation.

5. The method of preconditioning of claim 1 in which the catalyst recovered for use in said hydrocarbon synthesis process contains less than about 20% of 0-20 micron material.

6. The method of claim 1 in which a pressure of about atmospheric is maintained during the preconditioning treatment.

WILLIAM J. MATTOX.

REFERENCES CITED

The following references are of record in the file of this patent:

UNITED STATES PATENTS

| Number | Name | Date |
|---|---|---|
| 1,789,507 | Aarts | Jan. 20, 1931 |
| 2,437,051 | Sensel et al. | Mar. 2, 1948 |
| 2,438,584 | Stewart | Mar. 30, 1948 |
| 2,445,795 | Millendorf | July 27, 1948 |
| 2,445,796 | Millendorf | July 27, 1948 |
| 2,478,899 | D'Ouville | Aug. 16, 1949 |
| 2,481,841 | Hemminger | Sept. 13, 1949 |